US012637224B2

(12) United States Patent
Tabar et al.

(10) Patent No.: US 12,637,224 B2
(45) Date of Patent: May 26, 2026

(54) MULTI-DRIVE UNIT POWERPLANT FOR AN AIRCRAFT

(71) Applicant: Pratt & Whitney Canada Corp., Longueuil (CA)

(72) Inventors: Roja Tabar, Boucherville (CA); Ann Marie Unnippillil, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/874,981

(22) Filed: Jul. 27, 2022

(65) Prior Publication Data

US 2024/0034478 A1 Feb. 1, 2024

(51) Int. Cl.
*B64D 31/06* (2024.01)
*B64D 27/02* (2006.01)
*B64D 27/24* (2024.01)

(52) U.S. Cl.
CPC ............. *B64D 31/06* (2013.01); *B64D 27/24* (2013.01); *B64D 27/026* (2024.01)

(58) Field of Classification Search
CPC .. B64D 31/10; B64D 35/08; B64D 2027/026; B64D 27/026; B64C 27/14
See application file for complete search history.

(56) References Cited

U.S. PATENT DOCUMENTS

| | | | | |
|---|---|---|---|---|
| 4,454,754 | A | * | 6/1984 | Zagranski ............... F01D 21/14 |
| | | | | 340/439 |
| 5,363,317 | A | * | 11/1994 | Rice ....................... B64D 31/12 |
| | | | | 701/99 |
| 9,045,223 | B2 | | 6/2015 | Connaulte |
| 10,040,566 | B2 | | 8/2018 | Waltner |
| 10,180,078 | B2 | | 1/2019 | Roach |
| 10,436,060 | B2 | | 10/2019 | Dubreuil |
| 10,578,031 | B2 | | 3/2020 | Lescher |
| 11,174,013 | B2 | | 11/2021 | Olson |
| 2005/0007246 | A1 | * | 1/2005 | Yen .......................... B60Q 1/46 |
| | | | | 340/471 |
| 2014/0182560 | A1 | * | 7/2014 | Veit ..................... F02D 41/0025 |
| | | | | 123/478 |
| 2017/0174337 | A1 | * | 6/2017 | Roberts .................. B64U 50/20 |
| 2017/0275009 | A1 | * | 9/2017 | Huang ................... B64D 27/24 |
| 2017/0327238 | A1 | | 11/2017 | Roever |
| 2021/0179286 | A1 | * | 6/2021 | Harvey .................. F02C 3/113 |
| 2021/0229826 | A1 | | 7/2021 | Mercier |
| 2021/0316874 | A1 | | 10/2021 | Resnick |

(Continued)

OTHER PUBLICATIONS

EP Search Report for EP Patent Application No. 23188174.9 dated Dec. 14, 2023.

*Primary Examiner* — Ashesh Dangol
(74) *Attorney, Agent, or Firm* — Getz Balich LLC

(57) ABSTRACT

A method is provided for operating an aircraft system. During this operating method, a plurality of drive units are provided that include a thermal engine drive unit and an electric machine drive unit. A mechanical load is powered using a first of the drive units. The first of the drive units includes a first rotating structure. A parameter of the first rotating structure is monitored. A failure of the first of the drive units is detected based on the monitored parameter. A switch is made from the first of the drive units to a second of the drive units to power the mechanical load where the failure of the first of the drive units is detected.

19 Claims, 4 Drawing Sheets

(56)          References Cited

U.S. PATENT DOCUMENTS

| | | | |
|---|---|---|---|
| 2022/0144439 A1 | 5/2022 | Roberts | |
| 2022/0194613 A1* | 6/2022 | Lima | F02C 7/32 |
| 2023/0327584 A1 | 10/2023 | Kawazu | |
| 2023/0348081 A1* | 11/2023 | Riediger | B64D 27/12 |

* cited by examiner

400

Power mechanical load using
(at least or only) first drive unit
402

Monitor operation of
the first drive unit
404

Switch powerplant operating mode
when first drive unit failure is detected
406

MULTI-DRIVE UNIT POWERPLANT FOR AN AIRCRAFT

TECHNICAL FIELD

This disclosure relates generally to an aircraft and, more particularly, to a powerplant for the aircraft.

BACKGROUND INFORMATION

An aircraft may include a multi-drive unit powerplant. The aircraft, for example, may include multiple gas turbine engines driving a common propulsor rotor. The aircraft may alternatively include a gas turbine engine paired with an electric motor driving a common propulsor rotor. Various types and configurations of multi-drive unit powerplants are known in the art. While these known multi-drive unit powerplants have various benefits, there is still room in the art for improvement.

SUMMARY

According to an aspect of the present disclosure, a method is provided for operating an aircraft system. During this operating method, a plurality of drive units are provided that include a thermal engine drive unit and an electric machine drive unit. A mechanical load is powered using a first of the drive units. The first of the drive units includes a first rotating structure. A parameter of the first rotating structure is monitored. A failure of the first of the drive units is detected based on the monitored parameter. A switch is made from the first of the drive units to a second of the drive units to power the mechanical load where the failure of the first of the drive units is detected.

According to another aspect of the present disclosure, another method is provided for operating an aircraft system. During this operating method, a propulsor rotor and a plurality of drive units are provided. Rotation of the propulsor rotor is driven using a first of the drive units. The first of the drive units include a first rotating structure. A parameter of the first rotating structure is monitored. A failure of the first of the drive units is detected based on the monitored parameter. Rotation of the propulsor rotor is driven using a second of the drive units without the first of the drive units where the failure of the first of the drive units is detected.

According to still another aspect of the present disclosure, a system is provided for an aircraft. This aircraft system includes a rotor, a powerplant and a control system. The powerplant includes a plurality of drive units. A first of the drive units is configured to drive rotation of the rotor using a first rotating structure of the first of the drive units during a first mode. A second of the drive units is configured to drive rotation of the rotor using a second rotating structure of the second of the drive units during a second mode. The control system is configured to: monitor a parameter of the first rotating structure; detect a failure of the first of the drive units based on the monitored parameter; and signal the powerplant to switch from the first mode to the second mode where the failure of the first of the drive units is detected.

The rotor may be configured as or otherwise include a propulsor rotor. The drive units may include a thermal engine drive unit and an electric machine drive unit.

The first of the drive units and the second of the drive units may have a common configuration.

The first of the drive units and the second of the drive units may have different configurations.

The first of the drive units may be configured as or otherwise include the thermal engine drive unit. The second of the drive units may be configured as or otherwise include the electric machine drive unit.

The first of the drive units may be configured as or otherwise include the electric machine drive unit. The second of the drive units may be configured as or otherwise include the thermal engine drive unit.

The thermal engine drive unit may be configured as or otherwise include a gas turbine engine, a reciprocating piston engine or a rotary engine.

The electric machine drive unit may be configured as or otherwise include an electric motor when powering the mechanical load.

The mechanical load may include a rotor that is: mechanically coupled to and rotationally driven by the first rotating structure when powered by the first of the drive units; and mechanically coupled to and rotationally driven by a second rotating structure of the second of the drive units when powered by the second of the drive units.

The rotor may be configured as or otherwise include a propulsor rotor.

The monitored parameter may be a speed of the first rotating structure.

The monitored parameter may be a torque of the first rotating structure.

The detecting of the failure may include: comparing the monitored parameter to a threshold; and determining the failure of the first of the drive units when the monitored parameter is equal to or greater than the threshold.

The failure of the first of the drive units may be or otherwise include a failure of the first rotating structure.

The failure of the first of the drive units may be or otherwise include a breaking of a shaft of the first rotating structure.

The first of the drive units may be configured as or otherwise include the thermal engine drive unit. The failure of the first of the drive units may be or otherwise include a flameout of the thermal engine drive unit.

The first of the drive units may be configured as or otherwise include the thermal engine drive unit. The failure of the first of the drive units may be or otherwise include a stall of the thermal engine drive unit.

The switching may include: decoupling the first of the drive units from the mechanical load; and coupling the second of the drive units to the mechanical load.

The present disclosure may include any one or more of the individual features disclosed above and/or below alone or in any combination thereof The foregoing features and the operation of the invention will become more apparent in light of the following description and the accompanying drawings.

DETAILED DESCRIPTION

Figure 1:
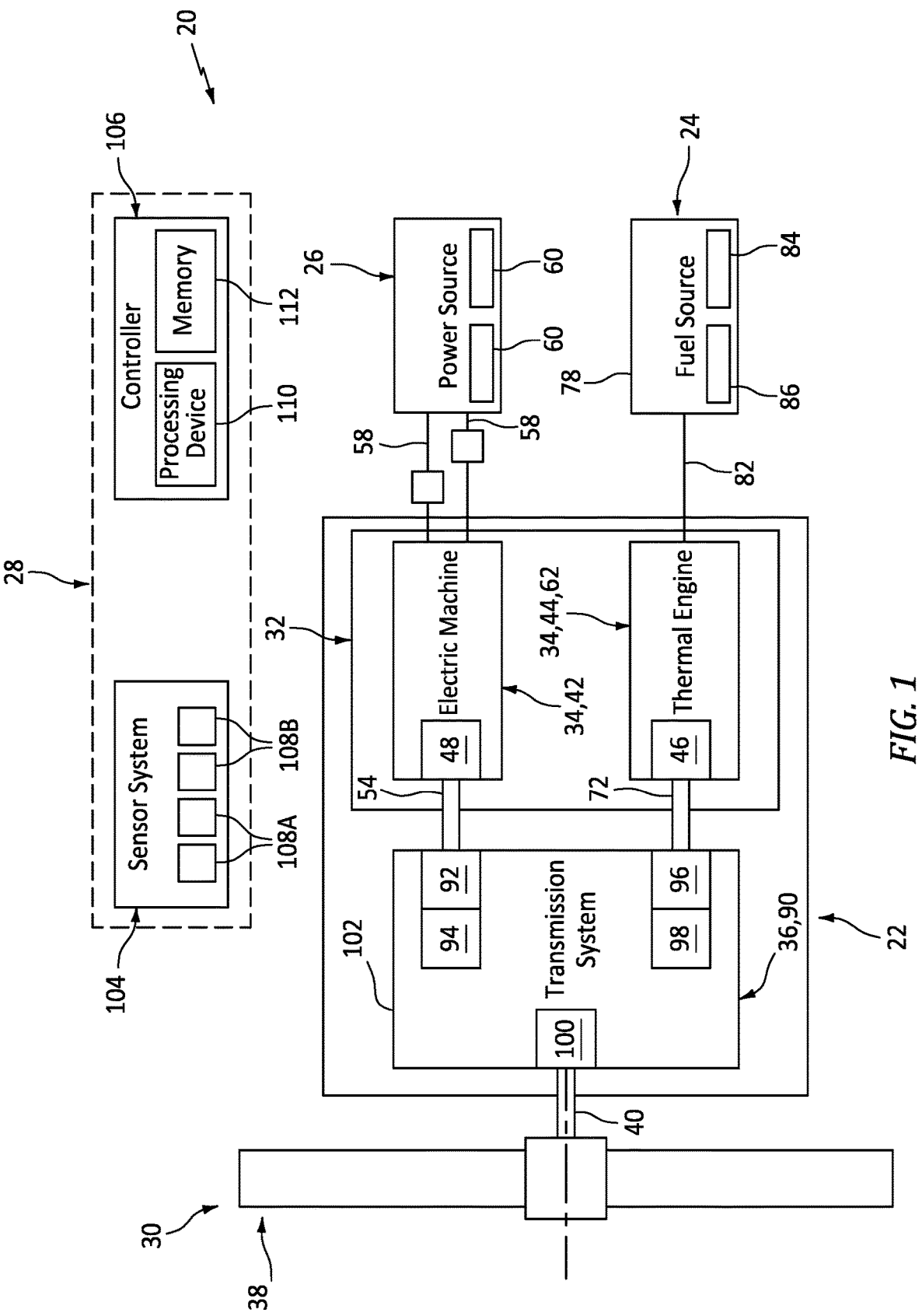
FIG. 1 is a schematic illustration of an aircraft system with multiple drive units operable to power a mechanical load such as a propulsor.

FIG. 1 is a schematic illustration of a system 20 for an aircraft. This aircraft may be an airplane, a helicopter, a drone (e.g., an unmanned aerial vehicle (UAV)), a spacecraft or any other manned or unmanned aerial vehicle. The aircraft system 20 of FIG. 1 includes an aircraft powertrain 22, a (e.g., thermal engine) fuel source 24 and an (e.g., electric machine) electrical power source 26. The aircraft system 20 of FIG. 1 also includes a control system 28 for monitoring and/or controlling operation of the aircraft system 20.

The powertrain 22 includes a mechanical load 30 and a multi-drive unit powerplant 32, which powerplant 32 includes a plurality of drive units 34. The powertrain 22 of FIG. 1 also includes a power transmission system 36 for transmitting mechanical power from the powerplant 32 and its drive units 34 to the mechanical load 30.

The mechanical load 30 may be configured as or otherwise include a rotor 38 mechanically driven by an output shaft 40 and/or another torque transmission device. The mechanical load 30 may be configured as an open or ducted bladed propulsor rotor of a propulsor for an aircraft propulsion system. Examples of the propulsor rotor include, but are not limited to, a propeller for a propeller engine (e.g., a turboprop engine), a fan for a ducted fan engine (e.g., a turbofan engine), and a helicopter rotor (e.g., a main rotor) for a helicopter engine (e.g., a turboshaft engine). The mechanical load 30 may alternatively be configured as a generator rotor of an electrical power generator where, for example, the powerplant 32 is configured as an auxiliary power unit (APU). The present disclosure, however, is not limited to the foregoing exemplary mechanical loads nor the foregoing exemplary powerplant configurations.

The drive units 34 are configured to power operation of the mechanical load 30 and, more particularly, drive rotation of the driven rotor 38. Examples of the drive units 34 include, but are not limited to, an electric machine (e.g., when operated as an electric motor), a thermal engine (e.g., an internal combustion engine) and a fuel cell. The drive units 34 may have different configurations. One of the drive units 34, for example, may be configured as an electric machine whereas another (the other) one of the drive units 34 may be configured as a thermal engine. With such an arrangement, the powerplant 32 may be referred to as a hybrid powerplant. Alternatively, the drive units 34 may have a common (the same) configuration. Each of the drive units 34, for example, may be configured as an electric machine or a thermal engine. Furthermore, while FIG. 1 illustrates the powerplant 32 with two of the drive units 34, the powerplant 32 may include more than two drive units 34 in other embodiments; e.g., three or more of the drive units 34. For ease of description, however, the first drive unit 34 may be described and referred to herein as an electric machine 42 and the second drive unit 34 may be described and referred to herein as a thermal engine 44.

The electric machine 42 may be configurable as an electric motor and/or an electric generator. For example, during a motor mode of operation, the electric machine 42 may operate as the electric motor to convert electricity received from the power source 26 into mechanical power. This mechanical power may be utilized for various purposes within the powerplant 32 such as, for example, rotating the driven rotor 38 and/or rotating a rotating structure 46 within the thermal engine 44 during thermal engine startup. During a generator mode of operation, the electric machine 42 may operate as the electric generator to convert mechanical power received from, for example, the engine rotating structure 46 and/or the driven rotor 38 into electricity. This electricity may be utilized for various purposes within the powerplant 32 such as, for example, electrically powering one or more electric components of the powerplant 32 and/or charging the power source 26. The electricity may also or alternatively be utilized for various purposes outside of the powerplant 32 such as, for example, electrically powering one or more electric components in the aircraft. Of course, in other embodiments, the electric machine 42 may alternatively be configured as a dedicated electric motor where the electric machine 42 is not also operable as an electric generator.

Figure 2:
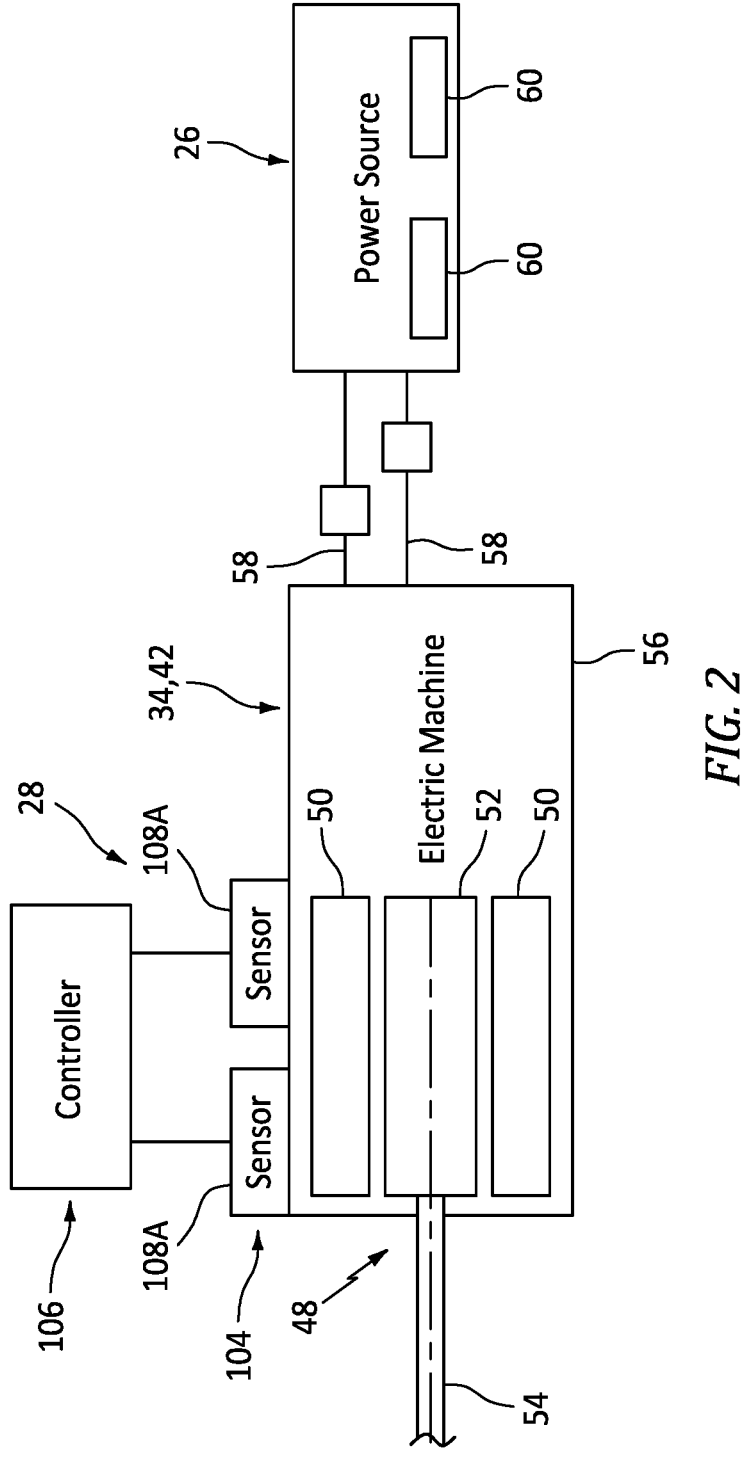
FIG. 2 is a schematic illustration of a portion of the aircraft system with one of its drive units configured as an electric machine.

The electric machine 42 of FIG. 2 includes an electric machine rotating structure 48 and an (e.g., annular) electric machine stator 50, where the machine rotating structure includes an electric machine rotor 52 and an electric machine shaft 54 coupled to and rotatable with the machine rotor 52. The machine stator 50 may be radially outboard of and circumscribe the machine rotating structure 48 and its machine rotor 52. The electric machine 42 also includes an electric machine case 56 that at least partially or completely houses the machine rotor 52 and the machine stator 50. The electric machine 42, however, is not limited to such an exemplary configuration. For example, the machine rotor 52 may alternatively be axially next to or radially outboard of and circumscribe the machine stator 50. In addition, the machine stator 50 may be curved and/or swept.

The power source 26 is electrically coupled with the electric machine 42 through one or more electrical leads 58; e.g., high voltage lines. The power source 26 is configured to store electricity. The power source 26 is also configured to provide the stored electricity to the electric machine 42 and/or receive electricity from the electric machine 42; e.g., during recharging. The power source 26, for example, may be configured as or otherwise include one or more batteries and/or one or more other electricity storage devices.

Referring to FIG. 1, the thermal engine 44 is configured to convert chemical energy stored within fuel into mechanical power. The thermal engine 44 of FIG. 3, for example, is configured as or may otherwise include a gas turbine engine 62. The present disclosure, however, is not limited to such an exemplary thermal engine. The thermal engine 44, for example, may alternatively be configured as or otherwise include a reciprocating piston engine, a rotary engine or any other type of internal combustion (IC) engine with an engine rotating structure capable of being monitored and/or capable of driving rotation of the driven rotor 38 as described herein. In the case of the reciprocating piston engine, the engine rotating structure 46 may be configured as or otherwise include a crankshaft and one or more pistons coupled to the crankshaft. In the case of the rotary engine, the engine rotating structure 46 may be configured as or otherwise include a driveshaft and an (e.g., triangular) engine rotor (e.g., eccentrically) coupled to the driveshaft. However, for ease of description, the thermal engine 44 may be described or referred to herein as the gas turbine engine 62.

Figure 3:
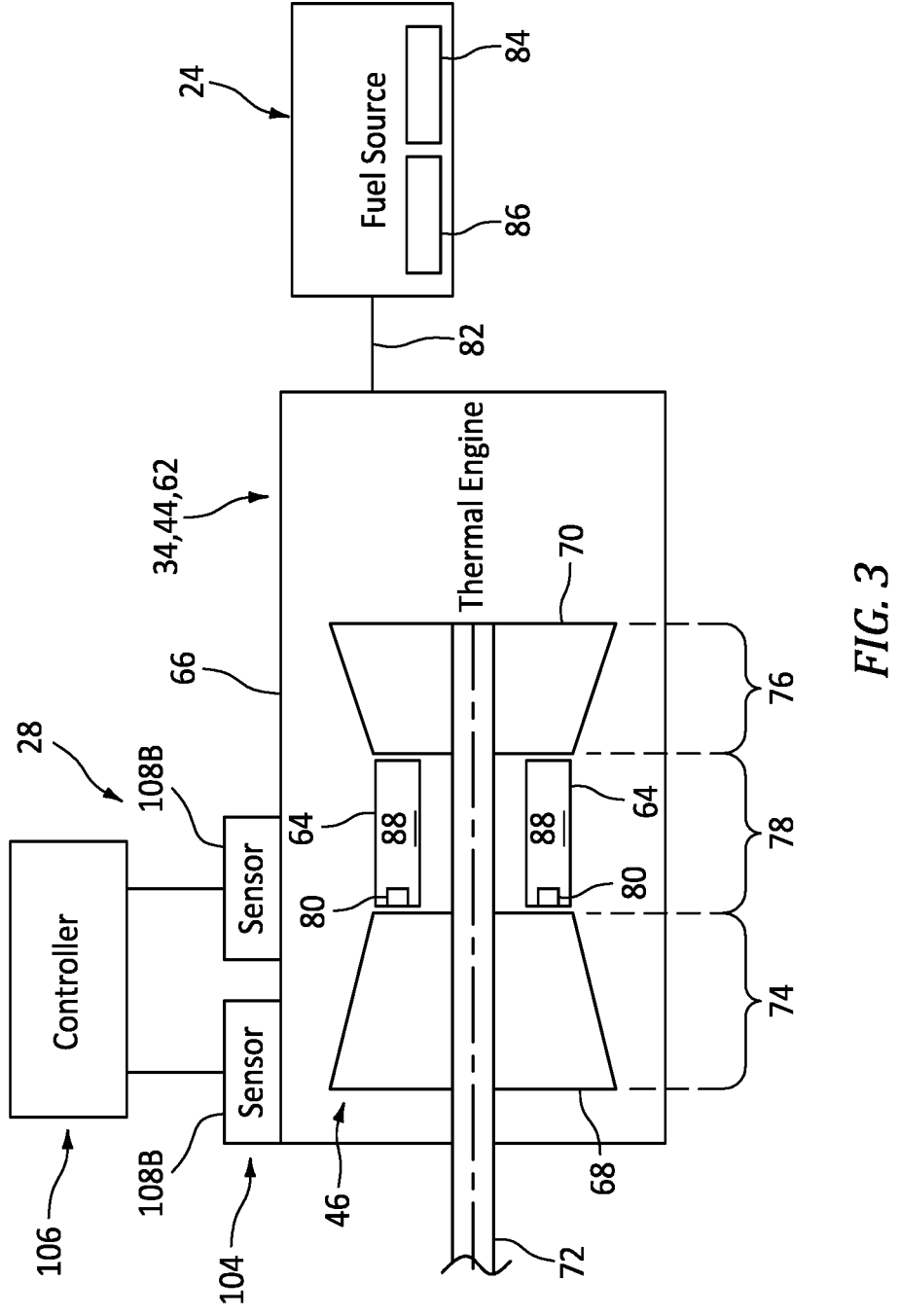
FIG. 3 is a schematic illustration of a portion of the aircraft system with one of its drive units configured as a thermal engine.

The gas turbine engine 62 of FIG. 3 includes the engine rotating structure 46, a combustor 64 and an engine case 66 housing the engine rotating structure 46 and the combustor 64. The engine rotating structure 46 includes a bladed compressor rotor 68, a bladed turbine rotor and an engine shaft 72 connecting and rotatable with the compressor rotor 68 and the turbine rotor 70. The compressor rotor 68 is arranged in a compressor section 74 of the gas turbine engine 62. The turbine rotor 70 is arranged within a turbine section 76 of the gas turbine engine 62. The combustor 64 is arranged within a combustor section 78 of the gas turbine engine 62. The gas turbine engine 62, however, is not limited to such an exemplary configuration. The gas turbine engine 62, for example, may include multiple of the rotating structures (e.g., spools) such that, for example, the compressor section 74 includes at least a low pressure compressor (LPC) rotor and a high pressure compressor (HPC) rotor and/or the turbine section 76 includes at least a high pressure turbine (HPT) rotor and a low pressure turbine (LPT) rotor. With multi-rotating structures, the engine rotating structure 46 for driving the driven rotor 38 (see FIG. 1) may include each of the elements 68, 70 and 72 or may be configured without the compressor rotor 68 where, for example, the turbine rotor 70 is a free turbine rotor/a power turbine rotor. The gas turbine engine 62 may also or alternatively be configured as a direct drive gas turbine engine or a geared gas turbine engine; e.g., where a geartrain couples together one or more engine rotors.

The fuel source 24 is configured to provide the fuel (e.g., jet fuel, diesel, gasoline, etc.) to the gas turbine engine 62 (the thermal engine 44). The fuel source 24 of FIG. 3, for example, is fluidly coupled with one or more fuel injectors 80 of the gas turbine engine 62 through at least (or only) one fuel line 82. The fuel source 24 is also configured to store (e.g., contain a quantity of) the fuel before, during and/or after heat engine operation. The fuel source 24 of FIG. 3, for example, includes a fuel reservoir 84 and a fuel flow regulator 86. The fuel flow regulator 86 may be or otherwise include a pump and/or a valve. This fuel flow regulator 86 is configured to direct fuel received from the fuel reservoir 84 to the fuel injectors 80 through the fuel line 82.

During operation of the gas turbine engine 62 of FIG. 3, air enters a gas path within the gas turbine engine 62 through an airflow inlet. The gas path extends sequentially through the compressor section 74, the combustor section 78 and the turbine section 76. This air is compressed by the compressor rotor 68 and directed into a combustion chamber 88 of the combustor 64. The fuel received by the gas turbine engine 62 from the fuel source 24 is injected into the combustion chamber 88 by the fuel injectors 80 and mixed with the compressed air to provide a fuel-air mixture. This fuel-air mixture is ignited and combustion products thereof flow through and cause the turbine rotor 70 and, thus, the engine rotating structure 46 to rotate. The rotation of the turbine rotor 70 drives rotation of the compressor rotor 68 and, thus, compression of the air received from the airflow inlet. The rotation of the engine rotating structure 46 also provides mechanical power for driving (e.g., rotating) the driven rotor 38 of FIG. 1.

The transmission system 36 of FIG. 1 may be configured as or otherwise include a geartrain 90. This geartrain 90 is configured to motively couple/operatively connect the electric machine 42 and the thermal engine 44 to the mechanical load 30 and its driven rotor 38. An electric machine coupler 92, for example, rotatably couples the electric machine 42 and its machine rotating structure 48 (e.g., see also FIG. 2) to a first component 94 of the geartrain 90; e.g., a gear, a carrier, a shaft, etc. A thermal engine coupler 96 rotatably couples the thermal engine 44 and its engine rotating structure 46 (e.g., see also FIG. 3) to a second component 98 of the geartrain 90; e.g., a gear, a carrier, a shaft, etc. The output shaft 40 rotatably couples the driven rotor 38 to a third component 100 of the geartrain 90; e.g., a gear, a carrier, a shaft, etc. These geartrain components 94, 98 and 100 are arranged together within a geartrain case 102 such that mechanical power may be transmitted through the transmission system 36, its geartrain 90 and geartrain components 94, 98 and 100, for example: (1) from the electric machine 42 to the mechanical load and its driven rotor 38; (2) from the thermal engine 44 to the mechanical load 30 and its driven rotor 38; (3) from the thermal engine 44 to the electric machine 42; and/or (4) from the electric machine 42 to the thermal engine 44.

The machine coupler 92 may provide a constant coupling between the machine rotating structure 48 and the geartrain 90. Alternatively, the machine coupler 92 may be configured as or otherwise include a clutch assembly configured to selectively couple the machine rotating structure 48 to the geartrain 90 or decouple the machine rotating structure 48 from the geartrain 90. With such an arrangement, the electric machine 42 may be coupled with the geartrain and, thus, the driven rotor 38 during operating modes where the electric machine 42 powers the mechanical load 30. However, when the electric machine 42 is not being operated as the electric motor or the electric generator, the electric machine 42 may be decoupled from the geartrain 90 to reduce drag on the rest of the powertrain 22.

The engine coupler 96 may provide a constant coupling between the engine rotating structure 46 and the geartrain 90. Alternatively, the engine coupler 96 may be configured as or otherwise include a clutch assembly configured to selectively couple the engine rotating structure 46 to the geartrain 90 or decouple the engine rotating structure 46 from the geartrain 90. With such an arrangement, the thermal engine 44 may be coupled with the geartrain 90 and, thus, the driven rotor 38 during operating modes where the thermal engine 44 powers the mechanical load However, when the thermal engine 44 is not being operated to power the mechanical load 30 or the electric machine 42, the thermal engine 44 may be decoupled from the geartrain 90 to reduce drag on the rest of the powertrain 22.

The control system 28 of FIG. 1 includes a sensor system 104 and a controller 106. The sensor system 104 is configured to monitor one or more operational parameters of the electric machine 42 and/or one or more operational parameters of the thermal engine 44. Examples of the electric machine parameters include, but are not limited to, a rotational speed and a torque of the machine rotating structure 48/one or more of the machine elements 52 and 54 (see FIG. 2). Examples of the thermal engine parameters include, but are not limited to, a rotational speed and a torque of the engine rotating structure 46/one or more of the engine elements 68, 70 and 72 (see FIG. 3). The sensor system 104 of FIG. 1, for example, includes one or more electric machine sensors 108A arranged with the machine rotating structure 48 and one or more of its elements 52 and 54 (see FIG. 2). The sensor system 104 of FIG. 1 also includes one or more thermal engine sensors 108B arranged with the engine rotating structure 46 and one or more of its elements 68, 70 and 72 (see FIG. 3). These sensors 108A and 108B (generally referred to as "108") may be configured as speed sensors and/or torque sensors. Examples of the speed sensors include, but are now limited to, a tachometer, a Hall effect sensor, an optical sensor, a magnetic sensor, a proximity sensor and an inductive sensor. Examples of the torque sensors include, but are not limited to, a phase-shift sensor and a pressure torque transducer sensor. The sensor system 104, of course, may also use one or more other types of sensors to calibrate the sensor system 104 and/or model, estimate or otherwise derive the monitored parameter(s) from one or more other measured parameters; e.g., temperature, pressure, etc.

The controller 106 is in signal communication (e.g., hardwired and/or wirelessly coupled) with the sensor system 104 (e.g., the sensors 108), one or more actuators and/or other devices (e.g., switches, regulators, etc.) controlling operation of the electric machine 42, and one or more actuators and/or other devices (e.g., switches, regulators, pumps, etc.) controlling operation of the thermal engine 44. The controller 106 may also be in signal communication with the transmission system 36 to control, for example, operation of one or more of the couplers 92 and 96; e.g., clutch assemblies. The controller 106 may be implemented with a combination of hardware and software. The hardware may include at least one processing device 110 and a memory 112, which processing device 110 may include one or more single-core and/or multi-core processors. The hardware may also or alternatively include analog and/or digital circuitry other than that described above.

The memory 112 is configured to store software (e.g., program instructions) for execution by the processing device 110, which software execution may control and/or facilitate performance of one or more operations such as those described herein. The memory 112 may be a non-transitory computer readable medium. For example, the memory 112 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 4:
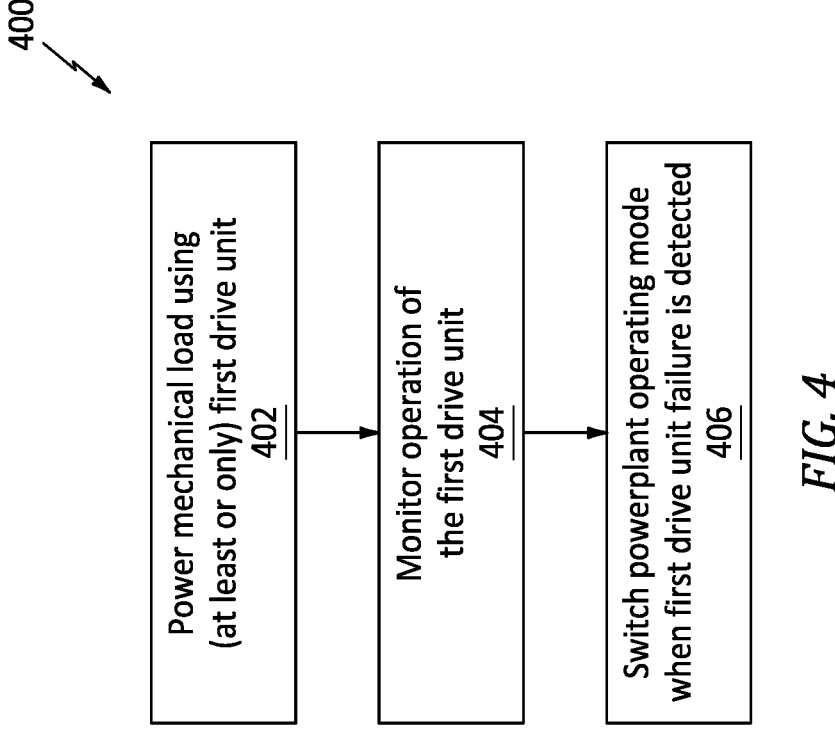
FIG. 4 is a flow diagram of a method for operating the aircraft system.

FIG. 4 is a flow diagram of a method 400 for operating an aircraft system. For ease of description, the operating method 400 is described herein with reference to the aircraft system of FIG. 1. The operating method 400 of the present disclosure, however, is not limited to such an exemplary aircraft system.

In step 402, a first of the drive units 34 powers the mechanical load 30. The first drive unit 34, for example, may be operated to rotate its rotating structure. The rotation of the first drive unit rotating structure may drive rotation of the driven rotor 38 through the transmission system 36 and its geartrain 90. During this step 402, a second of the drive units 34 may be non-operational. Alternatively, the second drive unit 34 may be operated to assist in powering the mechanical load 30 (or may be operated to receive power from the first drive unit 34). The second drive unit 34, for example, may be operated to rotate its rotating structure. The rotation of the second drive unit rotating structure may also (e.g., help to) drive rotation of the driven rotor 38 through the transmission system 36 and its geartrain 90. For ease of description, this first drive unit 34 is described herein as the thermal engine 44 and the second drive unit 34 is described herein as the electric machine 42. The present disclosure, however, is not limited to such an exemplary arrangement. The first drive unit 34, for example, may alternatively be the electric machine 42 and the second drive unit 34 may alternatively be the thermal engine 44, or any other combination of thermal engines, electric machines, etc.

In step 404, operation of the first drive unit 34 is monitored by the control system 28. The sensor system 104, for example, may measure at least one parameter of the engine rotating structure 46. For example, the sensor system 104 and its sensors 108B may measure the parameter for the engine shaft 72. The sensor system 104 may provide sensor data indicative of the measured parameter to the controller 106. The controller 106 may process the sensor data to monitor the parameter; e.g., shaft speed, shaft torque, etc. The monitored parameter, for example, may be compared to a threshold. This threshold may be retrieved from the memory 112. The threshold may be selected from a plurality of different possible stored thresholds based on, for example, one or more current operational parameters of the thermal engine 44 and/or the aircraft. For example, the threshold may be selected based on measured, estimated or modeled power output from the thermal engine 44 and/or measured, estimated or modeled airspeed of the aircraft.

Where the monitored parameter is less than the threshold, the operating method 400 may continue monitoring the first drive unit parameter. However, where the monitored parameter is equal to or greater than the threshold (e.g., after a first instance or after multiple instances), the controller 106 may determine a failure has occurred in the thermal engine 44. This failure may be indicative of a break in the engine rotating structure 46 (e.g., shearing of the engine shaft 72) and/or a decoupling of components of the engine rotating structure 46. The failure may also or alternatively be indicative of a flameout of the thermal engine 44 (e.g., in the combustor section 78 of FIG. 3) and/or a stall of the thermal engine 44 (e.g., the compressor section 74 of FIG. 3). The present disclosure, however, is not limited to such exemplary drive unit failures. Furthermore, as discussed above, the first drive unit 34 may alternatively be the electric machine 42. In such embodiments, the failure may be indicative of a break in the machine rotating structure 48 (e.g., shearing of the machine shaft 54) and/or a decoupling of components of the machine rotating structure 48.

In step 406, the powerplant 32 operating mode is switched when the failure is detected. The control system 28 and its controller 106, for example, may signal the powerplant 32 to switch from powering the mechanical load 30 with the thermal engine 44 (and also optionally with the electric machine 42) to powering the mechanical load 30 with the electric machine 42 without the thermal engine 44. For example, fuel may be cut off to the thermal engine 44 and electricity may be provided to (or increased to) the electric machine 42 such that the electric machine 42 may (e.g., fully) power mechanical load operation. The switch in the powerplant modes may be substantially seamless such that the electric machine 42 maintains rotation of the driven rotor 38 at a select speed. The electric machine 42 may thereby backup and operate in place of the thermal engine 44 in an unlikely event of a failure of the thermal engine 44. Furthermore, as discussed above, the first drive unit 34 may alternatively be the electric machine 42. In such embodiments, the thermal engine 44 may backup and operate in place of the electric machine 42 in an unlikely event of a failure of the electric machine 42.

To facilitate the switch between the thermal engine 44 driving rotation of the driven rotor 38, the control system 28 and its controller 106 may also or alternatively physically decouple the thermal engine 44 (the failing first drive unit 34) from the driven rotor 38 using the engine coupler 96 and/or physically couple the electric machine 42 (the working second drive unit 34) to the driven rotor 38 using the machine coupler 92. The uncoupling of the thermal engine 44 (the failing first drive unit 34) from the driven rotor 38 may also reduce internal drag (e.g., rotating friction) within the powertrain 22.

In some embodiments, the second drive unit 34 may be operated within its normal operating range to backup/operate in place of the failing first drive unit 34. In other embodiments, the second drive unit 34 may be operated outside of (e.g., above, beyond) its normal operating range to backup/operate in place of the failing first drive unit 34.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for operating an aircraft system, comprising:
providing a plurality of drive units including a thermal engine drive unit and an electric machine drive unit;
powering a mechanical load through a power transmission system using a first of the plurality of drive units, the first of the plurality of drive units comprising a first rotating structure and a first coupling component, the power transmission system comprising a second coupling component, the first coupling component constantly coupling to the second coupling component, and the first rotating structure having a constant coupling to the power transmission system without a clutch assembly through an interface between the first coupling component and the second coupling component;
monitoring a parameter of the first rotating structure, the monitoring of the parameter comprising measuring the parameter for the first rotating structure using one or more sensors in signal communication with a controller;
detecting a failure of the first of the plurality of drive units based on the monitored parameter using the controller; and
switching from the first of the plurality of drive units to a second of the plurality of drive units to power the mechanical load when the failure of the first of the plurality of drive units is detected,
wherein the detecting of the failure of the first of the plurality of drive units comprises:
comparing the monitored parameter to a threshold; and
determining the failure of the first of the plurality of drive units when the monitored parameter is equal to or greater than the threshold;
wherein the power transmission system further comprises a third coupling component coupled to the second coupling component; and
wherein powering the mechanical load comprises powering the mechanical load through the third coupling component and the second coupling component using the first of the plurality of drive units.

2. The method of claim 1, wherein
the first of the plurality of drive units comprises the electric machine drive unit; and
the second of the plurality of drive units comprises the thermal engine drive unit.

3. The method of claim 1, wherein the thermal engine drive unit comprises one of a gas turbine engine, a reciprocating piston engine or a rotary engine.

4. The method of claim 1, wherein the electric machine drive unit comprises an electric motor when powering the mechanical load.

5. The method of claim 1, wherein the mechanical load comprises a rotor that is
mechanically coupled to and rotationally driven by the first rotating structure when powered by the first of the plurality of drive units; and
mechanically coupled to and rotationally driven by a second rotating structure of the second of the plurality of drive units when powered by the second of the plurality of drive units.

6. The method of claim 1, wherein the monitored parameter comprises a speed of the first rotating structure, and/or a torque of the first rotating structure.

7. The method of claim 1, wherein the failure of the first of the plurality of drive units comprises a failure of the first rotating structure.

8. The method of claim 1, wherein the failure of the first of the plurality of drive units comprises a breaking of a shaft of the first rotating structure.

9. The method of claim 1, wherein
the first of the plurality of drive units comprises the thermal engine drive unit; and
the failure of the first of the plurality of drive units comprises a flameout of the thermal engine drive unit.

10. The method of claim 1, wherein
the first of the plurality of drive units comprises the thermal engine drive unit; and
the failure of the first of the plurality of drive units comprises a stall of the thermal engine drive unit.

11. The method of claim 1, wherein
the second of the plurality of drive units is coupled to the mechanical load.

12. The method of claim 1, wherein the electric machine drive unit includes a high voltage line.

13. A method for operating an aircraft system, comprising:
providing a propulsor rotor, a plurality of drive units and a geartrain coupling the plurality of drive units to the propulsor rotor;
driving rotation of the propulsor rotor using a first of the plurality of drive units, the first of the plurality of drive units comprising a first rotating structure and a first coupling gear attached to the first rotating structure, the first rotating structure having a constant coupling to the geartrain without a clutch assembly, the first coupling gear coupled to the geartrain through a constant coupling without a clutch assembly;
monitoring a parameter of the first rotating structure;
detecting a failure of the first of the plurality of drive units based on the monitored parameter; and
driving rotation of the propulsor rotor using a second of the plurality of drive units without the first of the plurality of drive units when the failure of the first of the plurality of drive units is detected,
wherein the detecting of the failure of the first of the plurality of drive units comprises:
comparing the monitored parameter to a threshold; and
determining the failure of the first of the plurality of drive units when the monitored parameter is equal to or greater than the threshold;
wherein the geartrain comprises a second coupling gear and a third coupling gear coupled to the second coupling gear; and
wherein the driving rotation of the propulsor rotor comprises driving rotation of the propulsor rotor through the third coupling gear and the second coupling gear using the first of the plurality of drive units.

14. The method of claim 13, wherein the first of the plurality of drive units and the second of the plurality of drive units have a same configuration.

15. The method of claim 13, wherein the first of the plurality of drive units and the second of the plurality of drive units have different configurations.

16. A system for an aircraft, comprising:

a rotor;

a transmission system comprising a first transmission coupling component and a second transmission coupling component coupled to the first transmission coupling component;

a powerplant comprising a plurality of drive units, a first of the plurality of drive units comprising a first rotating structure and a first coupling component attached to the first rotating structure, the first rotating structure having a constant coupling to the transmission system without a clutch assembly, the first of the plurality of drive units configured to drive rotation of the rotor about an output shaft using the first rotating structure during a first mode, the first coupling component having a constant coupling to the first transmission coupling component such that the first rotating structure has a constant coupling to the output shaft through the transmission system, and a second of the plurality of drive units configured to drive rotation of the rotor using a second rotating structure of the second of the plurality of drive units during a second mode; and a control system including one or more sensors and a controller in signal communication with the one or more sensors, the control system configured to monitor a parameter of the first rotating structure using the one or more sensors;

detect a failure of the first of the plurality of drive units based on the monitoring of the parameter using the controller; and signal the powerplant using the controller to switch from the first mode to the second mode when the failure of the first of the plurality of drive units is detected, wherein the plurality of drive units comprises a thermal engine drive unit and an electric machine drive unit; and wherein the detecting of the failure of the first of the plurality of drive units comprises:

comparing the monitored parameter to a threshold; and determining the failure of the first of the plurality of drive units when the monitored parameter is equal to or greater than the threshold; and wherein the first of the plurality of drive units is further configured to drive rotation of the rotor about the output shaft using the first rotating structure during the first mode through the first transmission coupling component and the second transmission coupling component.

17. The system of claim 16, wherein the first transmission coupling component is a first geartrain, the first geartrain is coupled with the output shaft.

18. The system of claim 16, wherein the second rotating structure has a second constant coupling to the output shaft through the transmission system.

19. The system of claim 18, wherein the transmission system further includes a third geartrain coupled to the output shaft, the second of the plurality of drive units further comprises a third coupling component attached to the second rotating structure, and the third coupling component is constantly coupled to the third geartrain of the transmission system.

* * * * *